Oct. 1, 1946.　　　　C. P. COLLINS　　　　2,408,375
MAGNETIC MOTOR

Filed April 27, 1944　　　2 Sheets-Sheet 1

Inventor

Clarence P. Collins,

By *Clarence A. O'Brien*
*and Harvey B. Jacobson*
Attorneys

Oct. 1, 1946.　　　　C. P. COLLINS　　　　2,408,375
MAGNETIC MOTOR
Filed April 27, 1944　　　　2 Sheets-Sheet 2
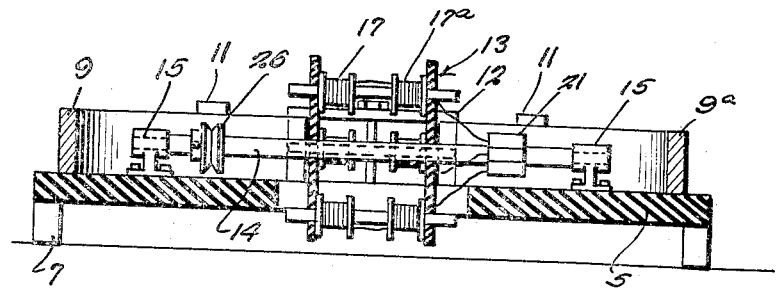
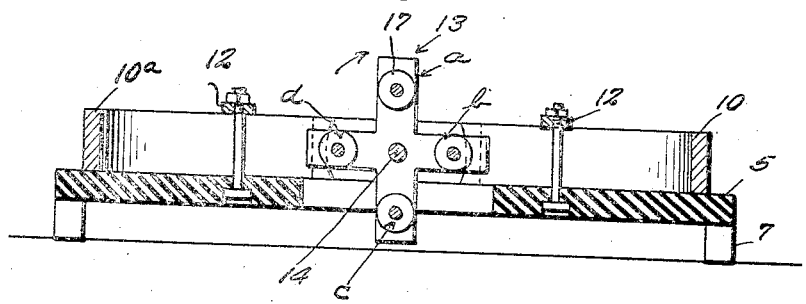
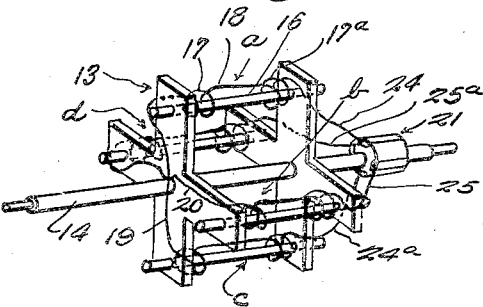
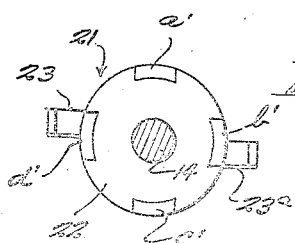
Inventor
Clarence P. Collins,
By
Clarence A. O'Brien
and Harvey B. Jacobson
Attorneys Patented Oct. 1, 1946

2,408,375

UNITED STATES PATENT OFFICE 2,408,375

MAGNETIC MOTOR

Clarence P. Collins, Titusville, Pa.

Application April 27, 1944, Serial No. 533,013

7 Claims. (Cl. 172—36)

This invention relates to certain new and useful improvements in magnetic motors employing permanent and electromagnets, the electromagnets being carried by the rotor of the motor, and said rotor operating within a field of permanent magnets.

The primary object of the present invention is to provide a motor of the above kind which is simple and durable in construction, and highly efficient in operation for a motor of this type.

A specific object of the present invention is to provide a motor of the above kind having a magnetic field so constructed that practically all of its force is utilized in driving the armature, and that the power of the permanent magnets is retained in them for a maximum length of time.

Another object of the present invention is to provide a motor of the above kind in which the armature is driven by the alternate action thereon of the repelling force of the electromagnets and the attracting force of the permanent magnets.

Other objects and features of the invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 3 is a vertical section taken on line 3—3 of Figure 1.

Figure 4 is a vertical section taken on line 4—4 of Figure 1.

Figure 5 is an enlarged detail section looking at and end of the commutator as seen looking in the direction of the arrows of line 5—5 of Figure 1.

Figure 6 is a somewhat diagrammatic perspective view of the armature and commutator.

Figure 1:
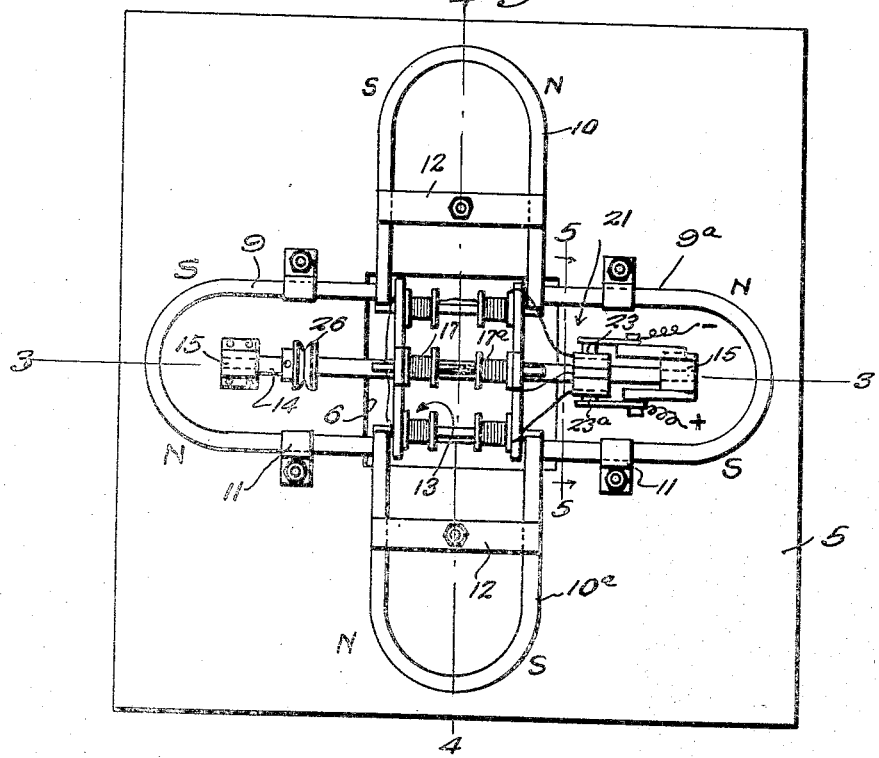
Figure 1 is a somewhat diagrammatic top plan view of a magnetic motor constructed in accordance with the present invention.
Figure 2:
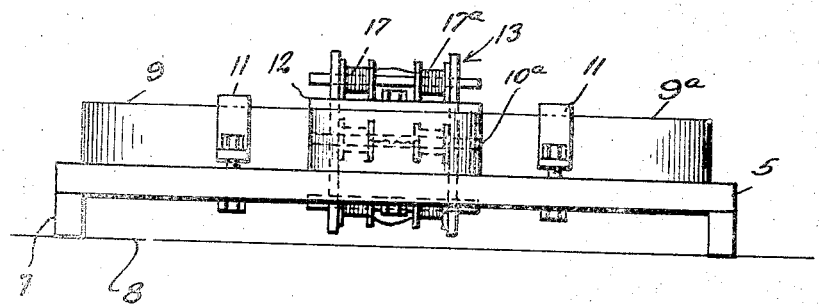
Figure 2 is an elevational view thereof as seen looking upwardly at Figure 1.

Referring in detail to the drawings, the present motor includes a plate-like base 5 having a central opening 6 to provide clearance for free operation of the armature of the motor as will later be apparent. The base 5 is provided with marginal supporting feet 7 which sustain the base at the necessary elevation so that the armature of the motor is disposed above the supporting surface 8 upon which the motor is arranged.

The motor includes a field comprising two pairs of permanent horseshoe magnets 9 and 9a and 10 and 10a, secured on the base 5 in cross formation, with the ends of the poles of the pair 9 and 9a abutting the sides of the corresponding poles of the other pair 10 and 10a near the ends of the latter. By reason of this arrangement, the power of the magnets 9 and 9a is added to that of the magnets 10 and 10a. The permanent magnets are disposed horizontally upon the base 5 and suitably rigidly clamped thereon, as at 11 and 12, so that the ends of the magnets project into the area of opening 6 at the sides of the latter.

The motor further includes an armature comprising a rotor 13 fixed on a shaft 14 that is journaled in bearings 15 upon the base 5 and that extends across the opening 6. The rotor 13 is disposed coincident with opening 6 and has four peripheral equally spaced electromagnets $a$, $b$, $c$ and $d$. Each electromagnet includes a core 16 and two windings 17 and 17a on the core and electrically connected in series, as at 18. The cores 16 are disposed parallel with the shaft 14 and transversely of the magnets 10 and 10a, the ends of said cores being movable adjacent and past the ends of said magnets 10 and 10a when the rotor is rotated. The windings of each pair of diametrically opposed electromagnets are electrically connected in series with each other, as at 19 and 20. In other words, the windings of electromagnets $a$ and $c$ are connected together at 19 and those of magnets $b$ and $d$ are connected together, as at 20, thereby forming two sets of electromagnets. As shown, the rotor merely consists of two spiders fixed on shaft 14 in spaced relation and connected by the cores 16 of the electromagnets, each spider having equally spaced radial arms whose outer ends are apertured to receive the cores 16.

The motor further includes a commutator 21 which provides means for alternately energizing and de-energizing the sets of electromagnets $a$ and $c$ and $b$ and $d$, whereby the rotor is driven by the alternate action thereon of the repelling force of the electromagnets and the attracting force of the permanent magnets. As shown, this commutator simply includes a cylindrical body of insulating material 22 secured on shaft 14 and having four equally spaced peripheral contacts $a'$, $b'$, $c'$ and $d'$, and a pair of stationary brushes 23 and 23a. The brushes 23 and 23a are disposed at opposite sides of the body 22 so as to simultaneously engage the contacts $a'$ and $c'$ and then the contacts *a'* and *c'* as the body 22 rotates. As indicated in Figure 6, the contact *a'* is electrically connected at 24 in series with the windings of electromagnet *a*, while the contact *c'* is electrically connected at 24 in series with the windings of electromagnet *c*. Similarly, the windings of electromagnet *b* are connected in series with contact *b'*, as at 25, and the windings of electromagnet *d* are electrically connected at 25a in series with contact *d'*.

With the parts arranged as shown, the electromagnets *b* and *d* are energized and their cores are disposed at the ends of the permanent magnets 10 and 10a. At this time, the repelling force of the electromagnets *b* and *d* cause the rotor to turn in a clockwise direction as viewed in Figure 4 for one-eighth of a revolution, whereupon the contacts *b'* and *d'* will disengage from the brushes 23 and 23a and cause the electromagnets *b* and *d* to be de-energized. The electromagnets *a* and *c* will then come within the fields of the permanent magnets 10 and 10a so as to be attracted by the latter and thereby cause further turning of the rotor another eighth of a revolution. The cores of electromagnets *a* and *c* are then disposed at the ends of the magnets 10 and 10a and the contacts *a'* and *c'* are engaged with the brushes 23 and 23a so that electromagnets *a* and *c* are energized. When the latter occurs, the repelling force of the magnets *a* and *c* causes further turning of the rotor still another eighth of a revolution, whereupon the contacts *a'* and *c'* disengage from the brushes 23 and 23a and cause the magnets *a* and *c* to be deenergized. At this time, the cores of magnets *b* and *d* come within the fields of the magnets 10 and 10a so as to be attracted by the latter and so as to cause turning of the rotor yet another eighth of a revolution. This cycle of operation is rapidly repeated so that the rotor is continuously driven by the alternate action thereon of the repelling force of the electromagnets and the attracting force of the permanent magnets. It is to be noted that the windings 17 and 17a are wound to the left as viewed in Figure 6, the outside and final wrap of winding 17a being connected to the inside or first wrap of winding 17. These windings are suitably constructed and separated in accordance with practices well known in the electrical art. Also, the brush 23a is connected to the positive side of a source of electricity and the brush 23 is connected to the minus side thereof, as indicated in Figure 1. A pulley 26 may be provided on shaft 14 to transmit power therefrom.

From the foregoing description, it is believed that the construction, operation and advantages of the present invention will be readily understood and appreciated by those skilled in the art. Minor changes in details of construction illustrated and described are contemplated, such as fairly fall within the spirit and scope of the invention as claimed.

What I claim is:

1. In a magnetic motor, the combination of two pairs of opposed permanent magnets arranged in cross formation, of an armature mounted for rotation about an axis located between and extending transversely of the permanent magnets of one pair, said armature including peripheral electromagnets having cores disposed parallel with the axis of rotation of the armature and having their ends arranged to move adjacent but inwardly of and past the ends of the permanent magnets of said one pair as the armature rotates, said electromagnets being arranged in the same plane and electrically connected in series, and a commutator comprising means for alternately energizing and de-energizing the pairs of electromagnets, whereby the armature is driven by the alternate action thereon of the repelling force of the electromagnets and the attracting force of the permanent magnets.

2. In a magnetic motor, the combination of a pair of opposed permanent magnets, of an armature mounted for rotation about an axis located between and extending transversely of said permanent magnets, said armature including peripheral electromagnets having cores disposed parallel with the axis of rotation of the armature and having their ends arranged to move adjacent and past the ends of the permanent magnets as the armature rotates, and a second pair of permanent magnets, said pairs of permanent magnets being arranged in cross formation with the ends of the poles of the second-named pair abutting the sides of the corresponding poles of the first-named pair near the ends of the latter.

3. In a magnetic motor, the combination of a pair of opposed permanent magnets, of an armature mounted for rotation about an axis located between and extending transversely of said permanent magnet, said armature including peripheral electromagnets having cores disposed parallel with the axis of rotation of the armature and having their ends arranged to move adjacent and past the ends of the permanent magnets as the armature rotates, said armature further including a pair of spaced spiders having four equally spaced radial arms aligned in pairs, the core of each electromagnet extending through a pair of said arms and projecting outwardly thereof in position to move past the ends of the permanent magnets.

4. In a magnetic motor, the combination of a pair of opposed permanent magnets, of an armature mounted for rotation about an axis located between and extending transversely of said permanent magnets, said armature including peripheral electromagnets having cores disposed parallel with the axis of rotation of the armature and having their ends arranged to move adjacent and past the ends of the permanent magnets as the armature rotates, a horizontal base having a central opening through which the armature revolves, and means clamping said permanent magnets upon said base.

5. In a motor of the type described an insulator base, a pair of oppositely disposed aligning permanent spaced apart magnets, a shaft midway between the same, a rotor on the shaft, a series of electro-magnets peripherally mounted on the rotor, said last magnets including cores projecting beyond each side of the rotor adapted to be directly acted upon by said first magnets, said electro-magnets being arranged in opposing sets, a commutator on said shaft arranged to alternately deenergize and energize said sets for attraction by and repulsion of said permanent magnets, said electro-magnets being formed in spaced apart pairs connected in series, said base having an opening through which rotor operates, a second pair of transversely disposed permanent magnets having their terminals engaging the terminals of the first pair of permanent magnets, and means for fixing all of said permanent magnets in contact with one another.

6. In a motor of the type described an insulator base, a pair of oppositely disposed aligning permanent spaced apart magnets, a shaft midway between the same, a rotor on the shaft, a series of electro-magnets peripherally mounted on the rotor, said last magnets including cores projecting beyond each side of the rotor adapted to be directly acted upon by said first magnets, said electro-magnets being arranged in opposing sets, a commutator on said shaft arranged to alternately deenergize and energize said sets for attraction by and repulsion of said permanent magnets, said electro-magnets being formed in spaced apart pairs connected in series, said base having an opening through which rotor operates, and a second pair of transversely disposed permanent magnets having their terminals engaging the terminals of the first pair of permanent magnets.

7. In a motor of the type described an insulator base, a pair of oppositely disposed aligning permanent spaced apart magnets, a shaft midway between the same, a rotor on the shaft, a series of electro-magnets peripherally mounted on the rotor, said last magnets including cores projecting beyond each side of the rotor adapted to be directly acted upon by said first magnets, said electro-magnets being arranged in opposing sets, a commutator on said shaft arranged to alternately deenergize and energize said sets for attraction by and repulsion of said permanent magnets, said electro-magnets being formed in spaced apart pairs connected in series, and said base having an opening through which rotor operates.

CLARENCE P. COLLINS.